March 3, 1953

R. W. DELLINGER 2,630,177

INERTIA OVERCOMING DEVICE FOR FLYING SHEARS

Filed Nov. 17, 1950

INVENTOR.
ROBERT W. DELLINGER
BY

ATTORNEYS

March 3, 1953  R. W. DELLINGER  2,630,177
INERTIA OVERCOMING DEVICE FOR FLYING SHEARS
Filed Nov. 17, 1950  3 Sheets-Sheet 2

INVENTOR.
ROBERT W. DELLINGER
BY
West & Oldham
ATTORNEYS

March 3, 1953 R. W. DELLINGER 2,630,177
INERTIA OVERCOMING DEVICE FOR FLYING SHEARS
Filed Nov. 17, 1950 3 Sheets-Sheet 3

INVENTOR.
ROBERT W. DELLINGER
BY
ATTORNEYS

Patented Mar. 3, 1953

2,630,177

UNITED STATES PATENT OFFICE 2,630,177

INERTIA OVERCOMING DEVICE FOR FLYING SHEARS

Robert W. Dellinger, North Olmsted, Ohio, assignor to The Yoder Co., Cleveland, Ohio, a corporation of Ohio Application November 17, 1950, Serial No. 196,285

7 Claims. (Cl. 164—49)

This invention relates to flying shears, or the like, which are adapted to be moved with a continuous or elongate moving article and to cut such article into a plurality of pieces, and more especially to means for effecting initial movement of the flying shear mechanism prior to engagement of same with a moving article.

Heretofore there have been different kinds of flying shear devices provided and many of same have functioned very effectively for cutting a continuous moving article, such as a tube or pipe, into a plurality of sections of predetermined length. However, even though such flying shear means usually are relatively heavy they still move along with the moving elongate article, usually by engaging with the article and being moved thereby. When severing a relatively thin wall, or weak tube into section or pieces by a flying shear, it has been difficult to start the flying shear means moving without imposing excessive and undesirable stresses on the moving tube.

It is the general object of the present invention to avoid and overcome the foregoing and other difficulties with present types of flying shear devices and to provide a novel mechanism of this type characterized by the minimum stress placed upon the elongate moving article by the shear means.

Another object of the invention is to provide a special cam member in a flying shear mechanism for starting longitudinal movement of the shear mechanism prior to engagement of same with a moving article.

A further object of the invention is to utilize a preparatory movement in a flying shear for starting movement of same in the direction of movement of the article to be engaged with and cut thereby.

Yet another object of the invention is to provide means and apparatus of the class described, which means are of sturdy and easily adjusted construction for initiating movement of the flying shear device.

Another object of the invention is to provide a positive-acting, effective member in a flying shear for overcoming the stationary inertia of the flying shear before such shear is secured to a moving elongate article.

The foregoing and other objects and advantages of the invention will be made more apparent as the specification proceeds.

For a better understanding of the invention, reference should be had to the accompanying drawings, wherein one presently preferred embodiment of the invention is shown, and wherein.

The present invention preferably relates to a flying shear of the general type which has a frame, guide posts protruding in parallel relation from the frame and movable along their axes with relation to the frame, a platen secured to and movable with said posts, and slide means carried by the platen and frame and positioning the actual shear mechanism thereon.

The shear mechanism may be of any conventional type and a feature of the invention is that cooperating cam members are provided on the platen and frame with one portion of such cam means being positioned on the slide and one on the frame to start longitudinal movement of the slide and associated means when the platen is moved towards the frame by suitable control means provided therefor.

Figure 1:
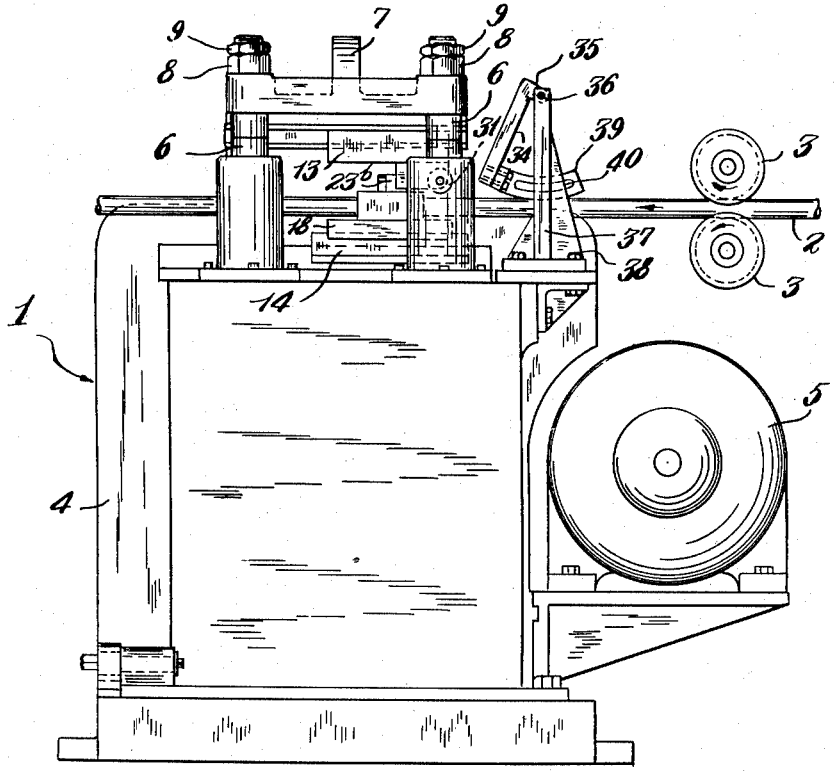
Fig. 1 is an elevation of a flying shear of the invention, showing it in operative position.

Attention now is directed to the details of the structure shown in the drawings, and a flying shear is indicated in general by the numeral 1, and is provided to sever a continuous, or elongate, moving article, such as a tube 2 into a plurality of sections. The flying shear 1 normally is used in conjunction with a tube-forming machine with a pair of rolls 3, of such machine, being indicated in Fig. 1 of the drawing, which rolls or similar means, position the tube 2 and move it along its axis.

Obviously the flying shear 1 need not be used in direct combination with a tube-forming machine since it can be used with any type of an elongate moving article that is to be cut into sections.

The flying shear of the invention includes a frame 4 and a suitable drive motor 5, or other equivalent device, is carried by the frame 4 for controlling operation of the shear 1. Normally, the frame 4 has a plurality of guide posts 6, slidably received therein and protruding therefrom. These guide posts 6 are at the extremities of the frame 4, with four guide posts being provided and carrying a platen 7 at the exposed or free ends of such posts. Nuts 8 and lock nuts 9 may be used to secure the platen 7 to the guide posts. Any suitable means (not shown) are provided for the guide posts 6 for reciprocating them along their longitudinal axes to move the platen 7 towards or away from the frame 4 for a purpose to be hereinafter described in detail. Such movement of the platen 7 is correlated with movement of the tube 2 so that the platen is reciprocated with each operative cycle of the apparatus of the invention.

Figure 2:
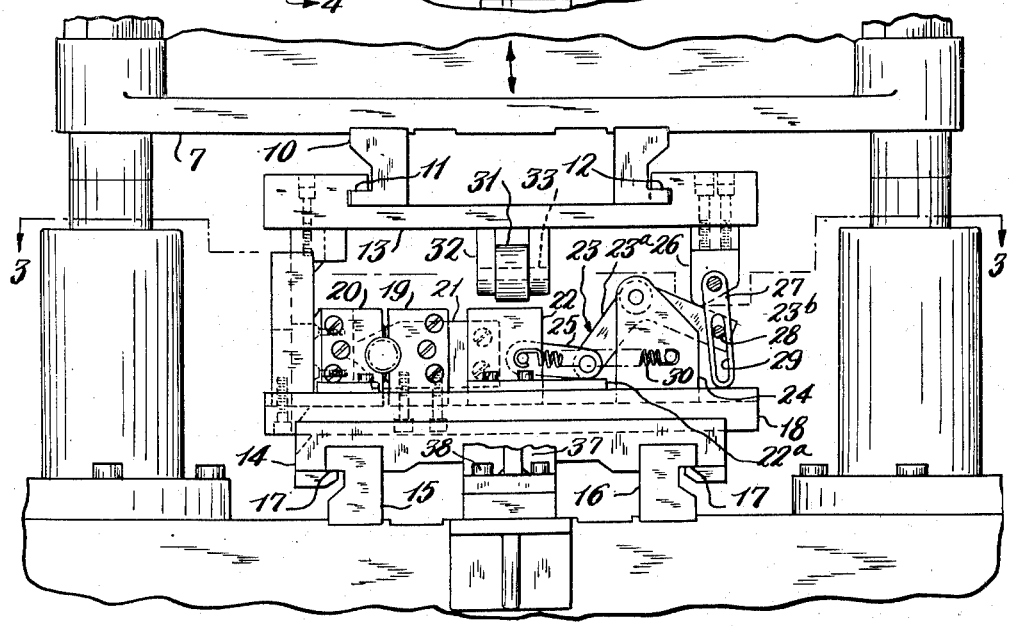
Fig. 2 is an enlarged side elevation of the apparatus shown in Fig. 1.

The platen 7 has a track-forming member 10 secured to the lower surface thereof and a pair of longitudinally extending flanges 11 and 12 are provided on the lower surface of this track member 10 so that a slide or control member 13 can be engaged with the flanges 11 and 12 and be positioned by the track-forming member for sliding movement therealong. Such slide 13, Fig. 2, and flanges 11 and 12 are permanently engaged with each other and any conventional stop means (not shown) may be provided if desired to prevent the slide from being withdrawn from engagement with such flanges.

A somewhat similar lower slide 14 of any desired construction is provided in the apparatus and normally is engaged with and carried by the frame 4 by means of a pair of track rails 15 and 16 that are suitably secured to the upper portion of the frame 4 in opposed parallel relation to engage with the slide 14 and position it for movement in a direction across the frame 4. Such direction of movement across the frame 4 is parallel to the longitudinal axis of the tube 2, and the slide 13 is movable in a direction parallel to the movement of the slide 14. Suitable flanges 17 may be provided on the track rails 15 and 16 to facilitate forming a tight or snug engagement between the slide 14 and the rails 15 and 16.

These slides 13 and 14 are adapted to be moved as a unit and this unit carries the actual shear mechanism of the apparatus. Such shear mechanism is of conventional construction and may include cooperating means for grasping the tube 2 and for cutting through the tube. The shear means are shown as including a positioning bar 18 that extends across the slide 14 and is suitably secured thereto while one part of a die or vise i. e. a vise block 19 is fixedly secured to such bar 18 for engaging a portion of the periphery of the tube 2. A movable vise block 20 is positioned on the bar 18 adjacent the vise block 19 but movable with relation thereto to complete the vise. Guide bars 20a engage opposed protruding flanges on the lower portion of the vise block 20 to secure it to the bar 18 for slide movement thereon. Such movable vise block 20 is adapted, in combination with the vise block 19, to grasp the surface of the tube 2 and fixedly position the slides 13 and 14 with relation to a given portion of the moving tube 2. A cutter knife or bar 21 is slidably engaged with the vise block 19 and it is usually secured to a control block 22 slidably engaged with the positioning bar 18 by a pair of guides 22a engaging opposite protruding edge portions of the block 22 to position the block for movement along the longitudinal axis of the bar 18. Such control block 22 is actuated by means of a bell crank 23 pivotally secured to a fixed bracket 24 on the bar 18. One arm 23a of the bell crank 23 engages a connection link 25, the other end of which pivotally engages the control block 22.

Actuation of the bell crank 23 is controlled by relative movement of the platen 7 and slide 13 towards or away from the frame 4. Such control means are shown as including an actuation finger 26 secured to the slide 13 and extending downwardly therefrom. The lower end of this finger 26 engages the other arm 23b of the bell crank 23 and depresses it upon movement of the platen 7 towards the frame at the lower extremity of such movement. Such movement of the bell crank 23, in turn, forces the cutter bar 21 to move transversely of the slide 14 into the vise block 20 and sever or cut any article positioned between the vise blocks 19 and 20.

Return movement of the cutter bar 21 is provided by a lost-motion connector link 27 pivotally secured to the finger 26 and extending downwardly therefrom to engage a pin 28 on the arm 23b of the bell crank 23 in a longitudinally extending slot 29 formed in the link 27. Hence, upward movement of the platen 7 and associated means lifts the adjacent arm of the bell crank 23 by means of the lost-motion connector link 27 but downward movement of the platen 7 does not initially affect the bell crank 23 in any manner. Coil springs 30, or similar means, usually extend between a pin 30a, journalled in the control block 22, and the bracket 24 for urging such control block and associated cutter bar into its non-operative position with relation to the vise blocks 19 and 20.

A particularly novel portion of the apparatus of the invention includes a roller or cam follower journalled on lugs 32, provided on the slide 13 on the lower surface thereof adjacent the rolls 3 by a pin 33. This roller 31, as an important feature of the invention, is positioned adjacent the forward end of the slide 13 and engages a cam, or cam bar 34, Fig. 4, that usually is positioned on the upper portion of the frame 4. The cam bar 34 normally has a straight, or flat operative surface and it may have an end portion 35 protruding from the upper end thereof at substantially right angles thereto for engagement with a pin 36 that pivotally secures the cam bar 34 to the upper portion of a bracket 37. The bracket 37 is secured to the upper portion of frame 4 by cap screws 38.

Usually the cam bar 34 is adjustable so that the lower end of the cam bar has an arcuate control bar 39 suitably secured thereto and protruding therefrom towards the tube moving rolls 3. A slot 40 is provided in the bar 39 and it receives a cap screw 41 therein. This screw 41 engages a tapped hole 42 formed in the bracket 37 whereby loosening the cap screw 41 will permit swinging or adjusting movement of the cam bar 34 and associated means and tightening such cap screw will secure the cam bar in a given position.

Figure 4:
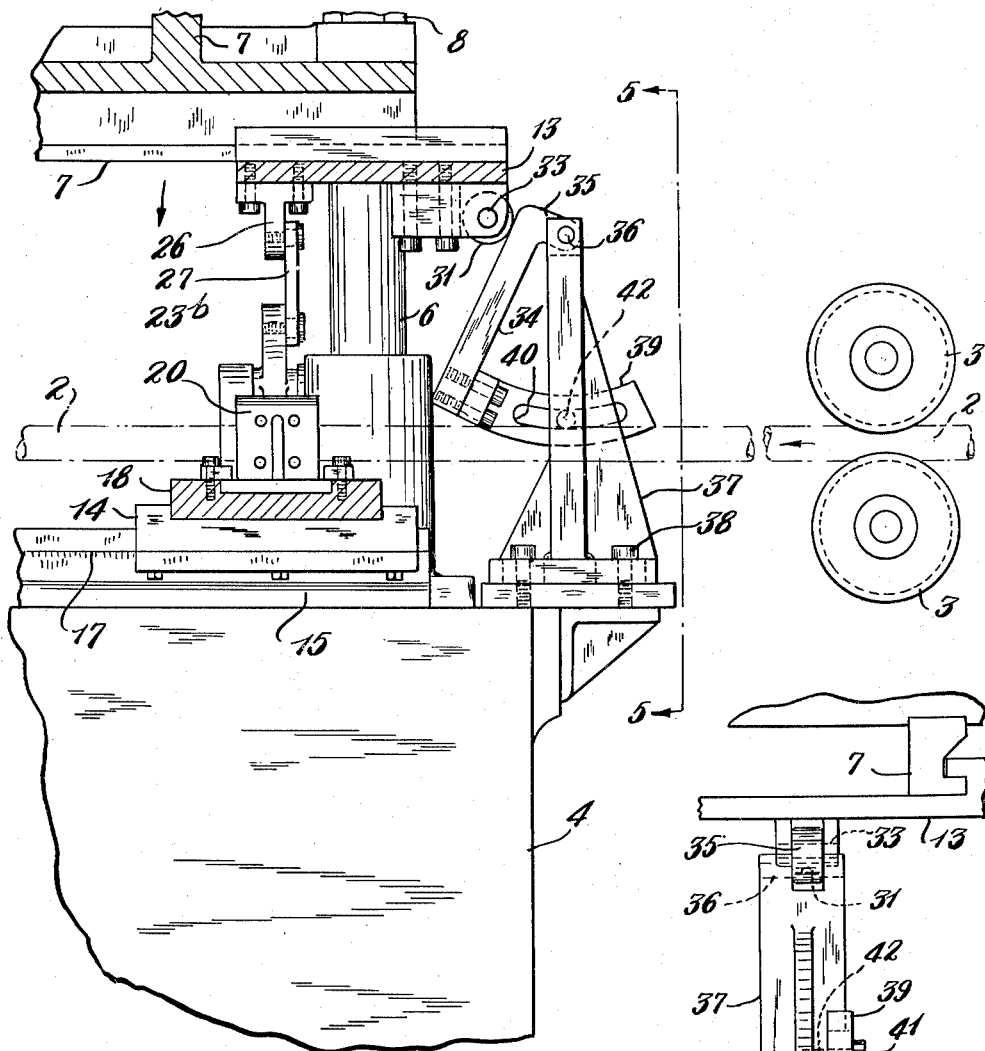
Fig. 4 is a fragmentary section taken on line 4—4 of Fig. 3 with the movable platen starting to move downwardly and Fig. 5 is a fragmentary section taken on line 5—5 of Fig. 4.
Figure 5:
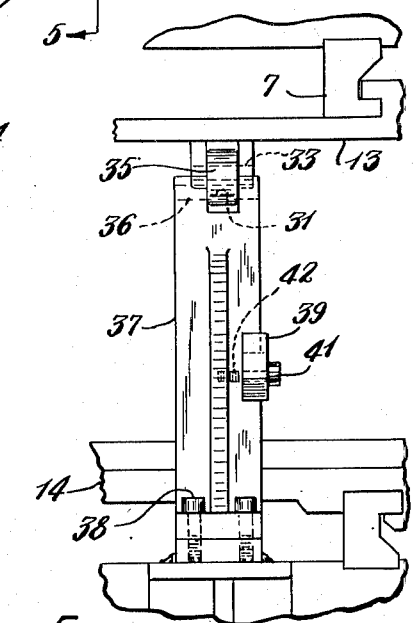

Fig. 4 of the drawing best shows that upon downward movement of the platen 7 and associated means when the slide 13 is protruding from the forward end of the platen 7, the roller 31 engages the upper portion of the cam bar 34 so that continued downward movement of the platen 7 will force the slide 13 to start movement longitudinally or across the apparatus in the direction of movement of the tube 2. It should be especially noted that such engagement of the relative cam members as indicated in Fig. 4 occurs prior to engagement of the tube 2 or similar member by the vise blocks 19 and 20 so that the stationary inertia of the slides 13 and 14 and associated means will be overcome by the cam action provided prior to any positive engagement between the flying shear apparatus and the moving tube 2.

Figure 3:
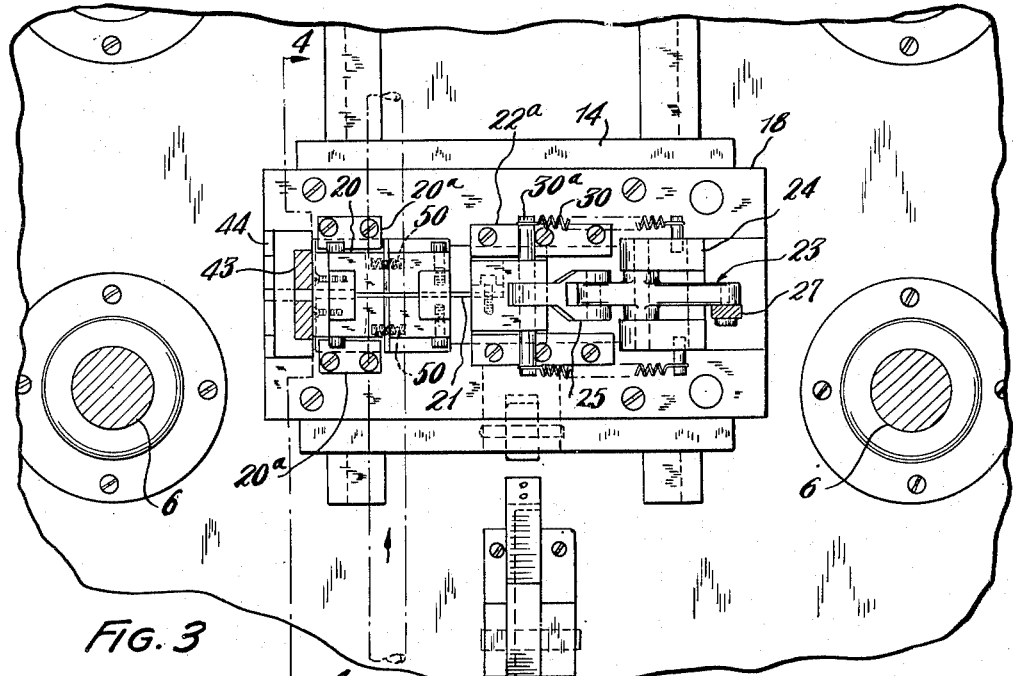
Fig. 3 is a horizontal section taken on line 3—3 of Fig. 2.

Normally the slides 13 and 14 are secured together for unitary movement thereof primarily by means of a bar 43, Fig. 3, that is secured to the slide 13 and extends downwardly therefrom to engage a channel 44 secured to the bar 18 and extending upwardly therefrom. As a further important function of the control bar 43, it engages the outer end of the vise-block 20 and forces it to move transversely inwardly of the apparatus of the invention for engaging the tube 2. The lower end (not shown) of the bar 43 may be beveled to facilitate smooth engagement of the bar and block 20. Again, such engaging action between the vise blocks 19 and 20 is correllated to the action of the cam means provided and the cutter means used in the shear apparatus so that the slides 13 and 14 and associated means will start to move along their positioning means before the tube 2 is engaged by the shear apparatus to move as a unit therewith. Thereafter, the cutter bar 21 is actuated by continuing movement of the platen 7 towards the frame 4. Coil springs 50 are compressed between adjacent surfaces of the vise blocks 19 and 20 to urge them resiliently into inoperative relation to each other.

Conventional means such as coil springs, (not shown) return the slides 13 and 14 and associated means from their advanced positions over to the positions indicated in Fig. 4 at the start of each cycle of operation of the apparatus of the invention.

It will be realized that other types of cam means or cam followers may be provided than those shown herein, if desired, and that the cam engaging roller and cam bar can be reversed insofar as the member that positions same is concerned. Sometimes other supports may be substituted for the guide posts 6.

The cam means provided are sturdy and are easily adjusted and function to overcome the inertia of the shear apparatus to avoid straining articles to be sheared thereby. Thus it is submitted that the objects of the invention have been realized.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. A flying shear or the like comprising a frame, a platen, means secured to said platen and engaging said frame to position said platen in one place with relation to said frame, said means being reciprocable to move said platen towards and from said frame, a control member slidably carried by said platen and movable only longitudinally of said frame, a cam contact member on said control member, and a cam bar secured to said frame in the path of movement of said platen for engaging said cam contact member on said control member to start sliding movement thereof, said cam bar and cam contact member contacting to start sliding movement of said control member only when said platen is moved toward said frame.

2. A flying shear or the like comprising a frame, guide posts protruding in parallel relation from said frame, a platen secured to and extending between said guide posts, said platen being only reciprocable by said posts towards and from said frame, a control plate slidably carried by said platen for movement only longitudinally of said frame, a roller journalled on said control plate, a cam bar having a straight cam surface secured to said frame in the path of movement of said platen at an acute angle to the axes of said guide posts, said cam bar directly engaging said roller on said plate to start sliding movement thereof upon predetermined movement of said platen towards the frame, and shear means connected to and movable with said control plate.

3. In a flying shear having a frame, longitudinally movable guide posts and a platen carried by such posts and movable towards the frame; a slide carried by the platen for movement with relation thereto, a roller journalled on said slide at a forward portion thereof, a support bracket on the shear frame, a cam bar journalled on said bracket adjacent said roller and protruding into the path of movement of said slide, and means for controlling the position of said cam bar and securing it in a fixed position with relation to said roller, movement of the platen toward the frame solely causing engagement of said roller and cam bar and starting said slide to move with relation to the platen.

4. In a flying shear, a frame member, longitudinally movable guide posts, a platen carried by said posts and movable thereby towards said frame member, a slide member carried by said platen for sliding movement longitudinally of said frame member only with relation thereto, a cam follower on one of said members, a cam on the other of said members adjacent said cam follower, means for moving said platen towards and from said frame member, said cam and cam follower engaging only on movement of said platen towards said frame member to cause said slide member to move with relation to said platen because of the movement of said platen.

5. In a shear as in claim 3, said means comprising a bar secured to said cam bar and protruding therefrom in the direction from which the article to be cut in the shear approaches the shear, said bar having an arcuate slot therein centered on the journal of said cam bar on said bracket, said cam bar and said bar being pivotal as a unit about the journal of said cam bar to adjust the position of said cam bar, and means extending through said slot and engaging said bracket for securing said bar and said cam bar in a given position.

6. A flying shear or the like comprising a frame, a platen, means secured to said platen and engaging said frame to move said platen towards and from said frame, a control member slidably carried by said platen and movable longitudinally of said frame, a cam contact member on said control member, a cam secured to said frame in the path of movement of said platen for engaging said cam contact member on said control member to start sliding movement thereof, said cam and cam contact member contacting to start sliding movement of said control member when said platen is moved toward said frame, means coupled to said control member and movable longitudinally of the frame therewith, article engaging means carried by said last-named means, and means provided in operative association with said platen for actuating said article engaging means by continued movement of said platen towards said frame after said cam contact member has engaged said cam.

7. In a flying shear having a frame, longitudinally movable guide posts and a platen carried by such posts and movable only toward and from said frame; a slide carried by the platen for movement with relation thereto, a roller journaled on said slide at a forward portion thereof, a support bracket on the said frame, a cam bar journaled on said bracket adjacent said roller and protruding into the path of movement of said slide for engaging said roller only when said platen is moved toward said frame, and means for controlling the position of said cam bar and securing it in a fixed position with relation to said roller, movement of said platen toward said frame causing engagement of said roller and cam bar to start said slide to move with relation to said platen.

ROBERT W. DELLINGER.

REFERENCES CITED

The following references are of record in the file of this patent:

UNITED STATES PATENTS

| Number | Name | Date |
|---|---|---|
| Re. 22,114 | Borzym | June 16, 1942 |
| 129,411 | Hovey | July 16, 1872 |
| 1,130,979 | Johnson | Mar. 9, 1915 |
| 2,234,999 | Yoder | Mar. 18, 1941 |
| 2,509,760 | Crafton | May 30, 1950 |